(No Model.)
P. H. BRACHER.
DISTILLING APPARATUS.
No. 403,638. Patented May 21, 1889.
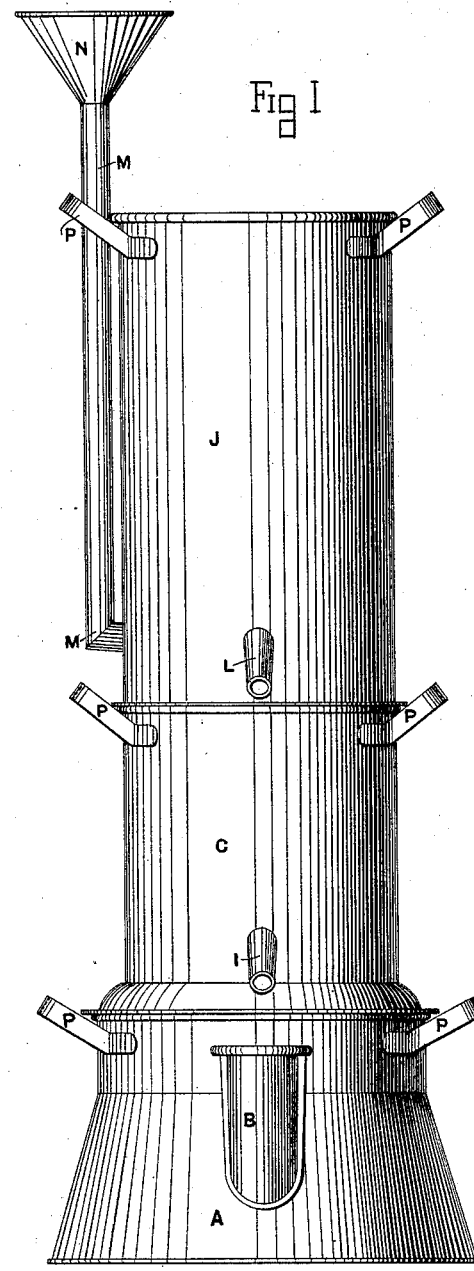
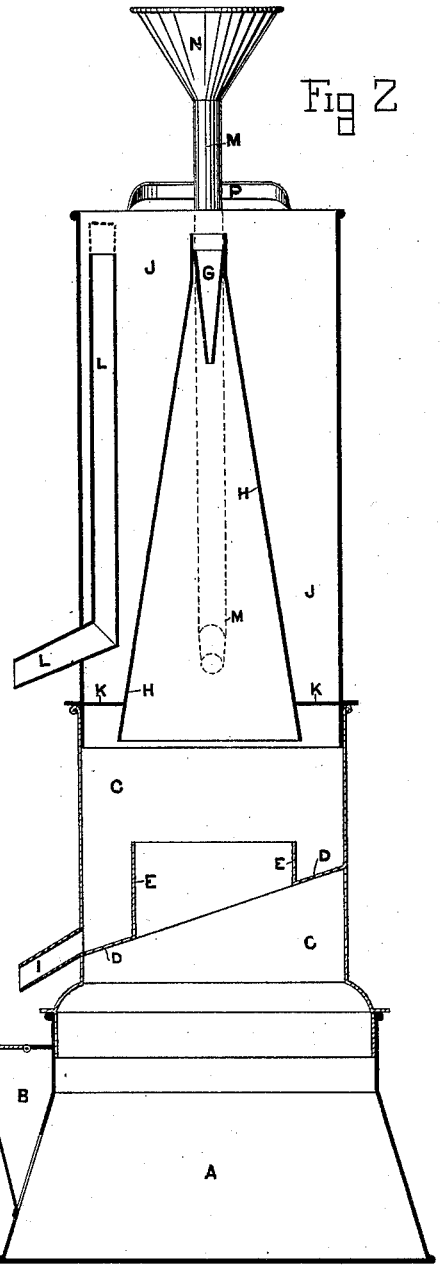
Witnesses
C. J. Bell
Edwin Nauck
Inventor,
Philip H. Bracher.
By Paine Ladd,
Atty's.
N. PETERS. Photo-Lithographer, Washington, D. C.

United States Patent Office.

PHILIP HENRY BRACHER, OF WINCANTON, COUNTY OF SOMERSET, ENGLAND.

DISTILLING APPARATUS.

SPECIFICATION forming part of Letters Patent No. 403,638, dated May 21, 1889.

Application filed May 16, 1887. Serial No. 238,384. (No model.) Patented in England November 4, 1886, No. 14,190.

*To all whom it may concern:*

Be it known that I, PHILIP HENRY BRACHER, a subject of the Queen of Great Britain, residing at Wincanton, in the county of Somerset, in the Kingdom of England, have invented certain new and useful Improvements in Distilling Apparatus, (for which I have secured Letters Patent in Great Britain, No. 14,190, dated November 4, 1886,) of which the following is a specification.

This invention pertains to a certain new and useful improved distilling apparatus, having for its object the production of a still that can be used for distilling water or other fluids for laboratory or household purposes, said still being simple in construction and effective in operation.

In the accompanying drawings, Figure 1 is a front view of my improved distilling apparatus; Fig. 2, a vertical sectional view thereof.

In the drawings, A designates a kettle or reservoir to hold the liquid to be distilled; B, an orifice with air-tight-fitting lid b, through which additional liquid can be supplied during the course of evaporation.

C is a cylinder fitting onto kettle A, as shown, by air-tight flanged joint. It has a sloping diaphragm, D, with a raised hollow curb, E, through which water can be poured into kettle A. This curb E is of such diameter that if any water be poured through cone G, hereinafter described, it shall certainly fall through said curb into kettle A; but water dripping from cone H shall fall beyond and outside of the curb, and running down diaphragm D will pass out through spout I.

J is a third cylinder, fitting with air-tight flanged joint on the intermediate cylinder, C. It has a diaphragm, K, with central orifice entirely closed by cone H. Cone H has preferably an internal cone, G, on its upper end to admit water. This cone G is fixed water-tight to cone H, but has an orifice at lowest point, as shown.

L is an overflow-spout placed with its top at a slightly-lower level than that of cones H and G, so as to prevent water entering cone G; but if the latter be used to feed the kettle or reservoir A, then the upper end of spout L is extended slightly higher than cones G and H, (dotted lines Fig. 2,) and the aperture in cone G is regulated in any convenient manner, so that the feed to kettle A shall about equal and supply the loss of water through evaporation. If the feed is regulated so as to be more than sufficient to run out of the waste-pipe L, then it will overflow into and through G and H and serve to replenish kettle A. M is a tube with a funnel, N, for admitting water into cylinder J. P P are handles.

The mode of action of the apparatus as applied to water-distillation is as follows: The kettle A being filled nearly to the top with water is set on a fire and a stream of water is allowed to trickle through pipe M from any extended supply into chamber J, which has been previously nearly filled with water. The steam from kettle A rises through curb E and cylinder C into cone H, and coming against the surface of the latter, kept cool by the stream of water passing through cylinder J, it is condensed, and running down the inside of cone H is discharged onto diaphragm D and out at spout I. When the water gets low in kettle A, it can be replenished through orifice B, or a regulated supply from cylinder J can be let in near the top of cone H by any convenient adjustable feed, or even through cone G, which is good, however, as a safety-valve.

I claim as my invention—

1. The herein-described distilling apparatus, comprising the three superimposed sections supported upon each other, the upper and lower sections being designed to retain water, the inclined diaphragm located in the intermediate section and having an upwardly-projecting hollow curb, and the cone open at its ends and located in the upper one of said sections and having its lower end wider than said curb above which it opens, substantially as set forth.

2. The herein-described distilling apparatus, comprising the three superimposed sections, the upper and lower ones of which are provided with water-supply openings, the cone secured in the upper one of said sections and having a smaller cone in its upper end, the water-outlet pipe in said upper section having its inner opening beneath the upper end of said cone, the inclined diaphragm having a curb projecting therefrom, and the outlet-pipe of the central section, substantially as set forth.

In testimony whereof I have signed my name to this specification in the presence of two subscribing witnesses.

PHILIP HENRY BRACHER.

Witnesses:
ROBT. C. TUDWAY,
364 *Gloucester Road, Horfield, Bristol.*
JNO. E. CHEESE,
32 *Belmont Road, Bristol.*